United States Patent
Hayase

(10) Patent No.: US 10,100,166 B2
(45) Date of Patent: Oct. 16, 2018

(54) METHOD FOR MANUFACTURING POLYETHYLENE RESIN FOAM MOLDED ARTICLE

(71) Applicant: Kaneka Corporation, Osaka (JP)

(72) Inventor: Yuki Hayase, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 15/690,122

(22) Filed: Aug. 29, 2017

(65) Prior Publication Data

US 2017/0362403 A1 Dec. 21, 2017

Related U.S. Application Data

(63) Continuation of application No. PCT/JP2016/059443, filed on Mar. 24, 2016.

(30) Foreign Application Priority Data

Mar. 27, 2015 (JP) .................. 2015-067591

(51) Int. Cl.
| | |
|---|---|
| C08J 9/24 | (2006.01) |
| C08K 3/34 | (2006.01) |
| C08K 5/103 | (2006.01) |
| C08L 23/06 | (2006.01) |
| C08J 9/00 | (2006.01) |
| C08J 9/12 | (2006.01) |
| B29C 44/00 | (2006.01) |
| B29C 44/08 | (2006.01) |
| C08J 9/18 | (2006.01) |
| C08J 9/232 | (2006.01) |

(52) U.S. Cl.
CPC ............... C08J 9/24 (2013.01); B29C 44/00 (2013.01); B29C 44/08 (2013.01); C08J 9/0023 (2013.01); C08J 9/0066 (2013.01); C08J 9/122 (2013.01); C08J 9/18 (2013.01); C08J 9/232 (2013.01); C08K 3/34 (2013.01); C08K 5/103 (2013.01); C08L 23/06 (2013.01); *C08J 2201/032* (2013.01); *C08J 2203/06* (2013.01); *C08J 2205/06* (2013.01); *C08J 2323/06* (2013.01)

(58) Field of Classification Search
CPC . C08J 9/24; C08J 9/0023; C08J 9/0066; C08J 2201/032; C08J 2323/06
See application file for complete search history.

(56) References Cited

U.S. PATENT DOCUMENTS

| | | | |
|---|---|---|---|
| 4,644,013 A | 2/1987 | Fujie et al. | |
| 4,778,829 A | 10/1988 | Ichimura et al. | |
| 4,968,723 A | 11/1990 | Senda et al. | |
| 5,026,736 A * | 6/1991 | Pontiff | B29B 9/06 521/182 |
| 2007/0287003 A1* | 12/2007 | Matsumura | C08J 9/18 428/319.3 |
| 2010/0267850 A1 | 10/2010 | Yoshida et al. | |
| 2012/0283347 A1 | 11/2012 | Nakayama | |
| 2013/0338246 A1 | 12/2013 | Yoshida | |
| 2014/0138868 A1 | 5/2014 | Nakayama | |
| 2016/0304693 A1 | 10/2016 | Itoi | |
| 2016/0319095 A1 | 11/2016 | Yoshida et al. | |
| 2017/0072605 A1 | 3/2017 | Sameshima et al. | |

FOREIGN PATENT DOCUMENTS

| | | |
|---|---|---|
| JP | H03-67106 B2 | 10/1991 |
| JP | H06-86544 B2 | 11/1994 |
| JP | 2000-17079 A | 1/2000 |
| JP | 2002-146082 A | 5/2002 |
| JP | 2010-059393 A | 3/2010 |
| JP | 2014-141551 A | 8/2014 |
| JP | 2014141551 A * | 8/2014 |
| WO | 2011/086938 A1 | 7/2011 |
| WO | 2012/121163 A1 | 9/2012 |
| WO | 2013/011951 A1 | 1/2013 |
| WO | 2013/031745 A1 | 3/2013 |
| WO | 2015/076306 A1 | 5/2015 |
| WO | 2015/098619 A1 | 7/2015 |
| WO | 2015/133619 A1 | 9/2015 |

OTHER PUBLICATIONS

Tables 1 and 2 from JP 2014-141551. Itoi. (Year: 2014).*
International Preliminary Report on Patentability issued in International Application No. PCT/JP2016/059443, dated Oct. 12, 2017 (6 pages).
International Search Report issued in International Application No. PCT/JP2016/059443, dated Jun. 14, 2016, (2 pages).

* cited by examiner

Primary Examiner — Kara B Boyle
(74) Attorney, Agent, or Firm — Osha Liang LLP

(57) ABSTRACT

A method of producing a polyethylene resin expanded molded product includes filling a mold with expanded polyethylene resin particles, wherein an internal pressure of 0.12 to 0.16 MPa is applied to the expanded polyethylene resin particles in the mold, and forming the polyethylene resin expanded molded product by heating the expanded polyethylene resin particles and fusing the expanded polyethylene resin particles. The expanded polyethylene resin particles includes 100 parts by weight of a polyethylene resin, 0.08 to 0.25 parts by weight of a cell nucleating agent, 0.3 to 0.8 parts by weight of a polyhydric alcohol fatty acid ester, and 0.01 to 10 parts by weight of a hydrophilic compound, each of the expanded polyethylene resin particles having a weight of 2.5 to 3.5 mg. The polyethylene resin expanded molded product has a density of 0.017 to 0.021 g/cm$^3$ and a thickness of 10 to 40 mm.

12 Claims, 1 Drawing Sheet

METHOD FOR MANUFACTURING POLYETHYLENE RESIN FOAM MOLDED ARTICLE

TECHNICAL FIELD

One or more embodiments of the present invention relate to a method of producing a polyethylene resin expanded molded product.

BACKGROUND

Polyethylene resin expanded molded products are excellent in flexibility and in heat insulating property. Therefore, the polyethylene resin expanded molded products are used for various purposes as shock-absorbing packing materials and heat insulating materials.

As a method of producing a polyethylene resin expanded molded product, in-mold expanding and molding has been known in which (i) a mold is filled with expanded particles obtained by pre-expanding polyethylene resin particles with use of a foaming agent such as a butane gas (bead expansion) and (ii) the expanded particles are heated, by introducing a heating medium, such as steam, into the mold, so that the expanded particles are fused to each other. In the bead expansion, a crosslinked polyethylene resin has been used as a raw material of a molded product because expanded particles which have a high expansion ratio and which are excellent in heat resistance are easily obtained. Meanwhile, it has been proposed to produce, with use of a non-crosslinked polyethylene resin, a molded product which is good in moldability (see Patent Literatures 1 and 2).

As a foaming agent used in such a field, a volatile organic foaming agent has been conventionally used because expanded particles having a high expansion ratio are obtained (see Patent Literatures 1 and 2). However, due to an increase in concern for environmental issues, an inorganic gas, such as a carbon dioxide gas, has come to be used as the foaming agent in recent years (see Patent Literatures 3 and 4).

Furthermore, in recent years, expanded polyethylene resin particles containing an antistatic agent have been used as a raw material of a polyethylene resin expanded molded product so that the polyethylene resin expanded molded product has an antistatic property. For example, Patent Literature 5 discloses obtaining a polyethylene resin expanded molded product by expanding and molding, in a mold, expanded polyethylene resin particles that have an expansion ratio of 15 times to 30 times and that have been obtained by expanding, with use of a carbon dioxide gas serving as a foaming agent, polyethylene resin particles which contain 0.1 parts by weight of a nucleating agent, 1.0 part by weight of a polyhydric alcohol fatty acid ester serving as an antistatic agent, and 0.2 parts by weight of a hydrophilic compound, relative to 100 parts by weight of a linear low-density polyethylene and each of which has a weight of 4.5 g.

Meanwhile, Patent Literature 6 discloses obtaining a polyethylene resin expanded molded product by expanding and molding, in a mold, expanded polyethylene resin particles that have an expansion ratio of 15 times to 30 times, that have an appropriate shrinking property, and that have been obtained by expanding, with use of a carbon dioxide gas serving as a foaming agent, polyethylene resin particles which contain 0.04 parts by weight of a nucleating agent, 1 part by weight to 2 parts by weight of a polyhydric alcohol fatty acid ester serving as an antistatic agent, and 0.2 parts by weight to 0.5 parts by weight of a hydrophilic compound and each of which has a weight of 1.3 g.

However, according to those techniques, in a case where such an expanded molded product which is obtained from expanded polyethylene resin particles having a high expansion ratio is made thin, there is room for improvement in fusibility of expanded polyethylene resin particles.

CITATION LISTS

Patent Literatures

[Patent Literature 1]
Japanese Patent No. 1696651 (published on Oct. 21, 1991)
[Patent Literature 2]
Japanese Patent No. 2017449 (Nov. 2, 1994)
[Patent Literature 3]
Japanese Patent Application Publication Tokukai No. 2000-17079 (Published on Jan. 18, 2000)
[Patent Literature 4]
Japanese Patent Application Publication Tokukai No. 2010-59393 (Mar. 18, 2010)
[Patent Literature 5]
International Publication No. WO2013/031745 (Published on Mar. 7, 2013)
[Patent Literature 6]
International Publication No. WO2013/011951 (Published on Jan. 24, 2013)

SUMMARY

One or more embodiments of the present invention provide a method of producing a polyethylene resin expanded molded product which has an antistatic property and which is good in fusibility of expanded polyethylene resin particles, having a high expansion ratio, even in a case where the polyethylene resin expanded molded product is made thin.

The inventors have found that, by (i) applying an internal pressure to expanded polyethylene resin particles which contain a cell nucleating agent, a polyhydric alcohol fatty acid ester, and a hydrophilic compound in respective given amounts relative to a base material resin and each of which has a weight in a given range and (ii) expanding and molding, in a mold, the expanded polyethylene resin particles to which the internal pressure has been applied, it is possible to produce a molded product which is good in fusibility of the expanded polyethylene resin particles, having a high expansion ratio, even in a case where the molded product is made thin.

That is, one or more embodiments of the present invention include:

[1] A method of producing a polyethylene resin expanded molded product having a density of 0.017 g/cm$^3$ to 0.021 g/cm$^3$ and having a thickness of 10 mm to 40 mm, the method including the steps of: (a) filling a mold with expanded polyethylene resin particles; and (b) heating the expanded polyethylene resin particles so that the expanded polyethylene resin particles are fused to each other, to form the polyethylene resin expanded molded product, the expanded polyethylene resin particles, with which the mold is filled, containing a polyethylene resin, a cell nucleating agent, a polyhydric alcohol fatty acid ester, and a hydrophilic compound, the expanded polyethylene resin particles containing the cell nucleating agent in an amount of not less than 0.08 parts by weight and not more than 0.25 parts by weight, the polyhydric alcohol fatty acid ester in an amount of not less than 0.3 parts by weight and not more than 0.8 parts by weight, and the hydrophilic compound in an amount of not less than 0.01 parts by weight and not more than 10 parts by weight, relative to 100 parts by weight of the polyethylene resin, each of the expanded polyethylene resin particles having a weight of not less than 2.5 mg and not more than 3.5 mg, in the step (a), an internal pressure of 0.12 MPa to 0.16 MPa being applied to the expanded polyethylene resin particles.

[2] The method as set forth in [1], wherein the polyhydric alcohol fatty acid ester is a glycerin fatty acid ester.

[3] The method as set forth in [1] or [2], wherein the cell nucleating agent is an inorganic nucleating agent.

[4] The method as set forth in [3], wherein the cell nucleating agent is talc, calcium stearate, calcium carbonate, silica, kaolin, titanium oxide, bentonite, or barium sulphate.

[5] The method as set forth in any one of [1] through [4], wherein the hydrophilic compound is a compound containing a carboxyl group, a hydroxyl group, an amino group, a sulfo group, or a polyoxyethylene group in a molecule, a derivative of the compound, or a hydrophilic polymer.

According to the method of producing a polyethylene resin expanded molded product in accordance with one or more embodiments of the present invention, it is surprisingly possible to obtain a polyethylene resin expanded molded product which exhibits an antistatic property and which is good in fusibility of expanded polyethylene resin particles, having a high expansion ratio, even in a case where the polyethylene resin expanded molded product is made thin (for example, a thickness of 10 mm to 40 mm). This is obtained by applying pressure to the expanded polyethylene resin particles, where each particle has a given weight, before a mold is filled with the expanded polyethylene resin particles, so that the expanded polyethylene resin particles have a given internal pressure.

DETAILED DESCRIPTION OF THE EMBODIMENTS

Figure 1:
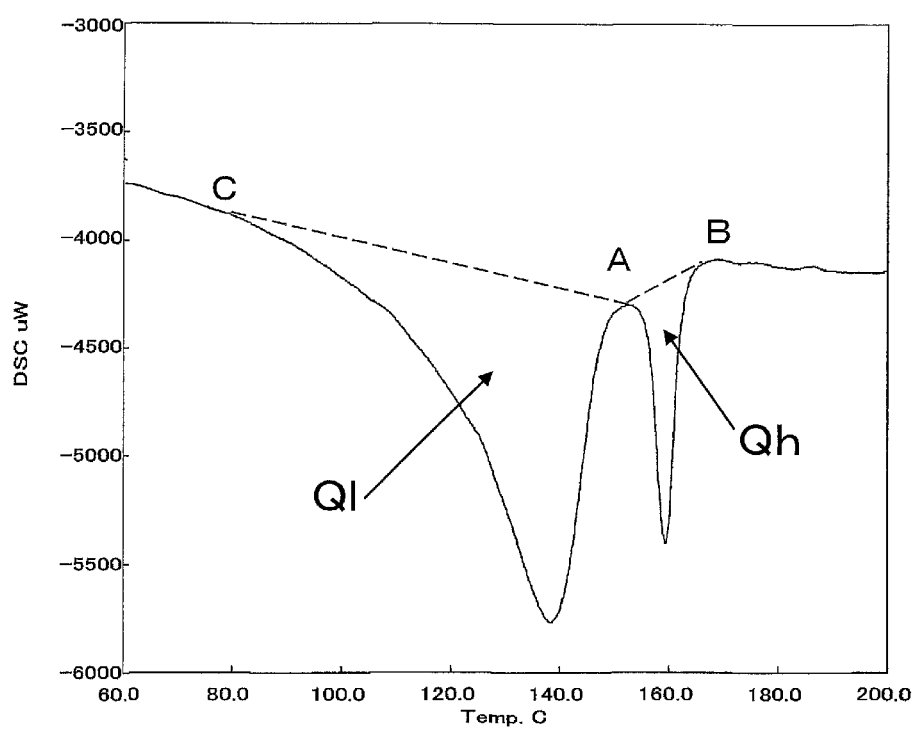
FIG. 1 illustrates an example of a DSC curve obtained by differential scanning calorimetry (DSC) according to one or more embodiments of the present invention, in which a temperature of expanded polyethylene resin particles is raised from 40° C. to 220° C. at a heating rate of 10° C./min. It is assumed that, in the DSC curve, (i) a point A is a point at which an absorbed heat quantity is the smallest between two melting peaks, that is, a low-temperature side melting peak and a high-temperature side melting peak, (ii) a point B is a point at which a tangent line drawn from the point A toward a high-temperature side touches the DSC curve, and (iii) a point C is a point at which a tangent line drawn from the point A toward a low-temperature side touches the DSC curve. In this case, a region surrounded by a line segment (A-B) and the DSC curve indicates a heat quantity (Qh) based on the high-temperature side melting peak, and a region surrounded by a line segment (A-C) and the DSC curve indicates a heat quantity (Ql) based on the low-temperature side melting peak.

The following description will discuss one or more embodiments of the present invention. However, the present invention is not limited to the following embodiments. The present invention is not limited to arrangements described below, but can be altered by a skilled person in the art within the scope of the claims. The present invention also encompasses, in its technical scope, any embodiment and any Example derived by combining technical means disclosed in differing embodiments and differing Examples. All of academic literatures and Patent Literatures cited in this specification will be referred to as references in this specification.

Expanded polyethylene resin particles used in one or more embodiments of the present invention contain a polyethylene resin serving as a base material resin, a cell nucleating agent, a polyhydric alcohol fatty acid ester, and a hydrophilic compound. Each of those components will be first described below. Then, a concrete method of producing the expanded polyethylene resin particles and a concrete method of producing a polyethylene resin expanded molded product will be described.

[1. Base Material Resin]

Examples of the polyethylene resin used as a base material resin in one or more embodiments of the present invention encompass high-density polyethylene resins, medium-density polyethylene resins, low-density polyethylene resins, and linear low-density polyethylene resins. Of those polyethylene resins, a linear low-density polyethylene resin may be used because expanded polyethylene resin particles having a high expansion ratio are obtained.

As the polyethylene resin used as a base material resin in one or more embodiments of the present invention, one that is obtained by blending two or more kinds of linear low-density polyethylene resins which are different in density can be also used. As the polyethylene resin used as a base material resin in one or more embodiments of the present invention, one that is obtained by blending a linear low-density polyethylene resin with at least one kind of polyethylene resin selected from the group consisting of high-density polyethylene resins, medium-density polyethylene resins, and low-density polyethylene resins can be also used.

As the linear low-density polyethylene resin used in one or more embodiments of the present invention, one that has a melting point of not lower than 115° C. and not higher than 130° C., a density of not less than 0.915 g/cm$^3$ and not more than 0.940 g/cm$^3$, and a melt index of not less than 0.1 g/10 min. and not more than 5 g/10 min. may be used. The melt index is a value measured at a temperature of 190° C., under a load of 2.16 kg, and according to JIS K7210.

The linear low-density polyethylene resin used in one or more embodiments of the present invention can contain a comonomer, other than ethylene, which is copolymerizable with ethylene. Examples of the comonomer copolymerizable with ethylene encompass α-olefins each having 4 to 18 carbon atoms. Concrete examples of the comonomer copolymerizable with ethylene encompass 1-butene, 1-pentene, 1-hexene, 3,3-dimethyl-1-butene, 4-methyl-1-pentene, 4,4-dimethyl-1-pentene, and 1-octene. Each of those comonomers can be used solely. Alternatively, two or more of those comonomers can be used in combination. In order for a copolymer to have a density falling within the above-described range, an amount of the comonomer contained in the copolymer by copolymerization may be approximately not less than 1% by weight and not more than 12% by weight of the copolymer.

[2. Cell Nucleating Agent]

Examples of the cell nucleating agent used in one or more embodiments of the present invention encompass inorganic nucleating agents such as talc, calcium stearate, calcium carbonate, silica, kaolin, titanium oxide, bentonite, and barium sulphate. Each of those cell nucleating agents can be used solely. Alternatively, two or more of those cell nucleating agents can be used in combination. Of those cell nucleating agents, talc may be used because uniform cells are obtained.

An amount of the cell nucleating agent contained in the expanded polyethylene resin particles of one or more embodiments of the present invention may be not less than 0.08 parts by weight and not more than 0.25 parts by weight, or not less than 0.1 parts by weight and not more than 0.2 parts by weight, relative to 100 parts by weight of the polyethylene resin. In a case where the amount of the cell nucleating agent is less than 0.08 parts by weight, a molded product having a high expansion ratio tends not to be obtained. In a case where the amount of the cell nucleating agent is more than 0.25 parts by weight, cells tend to be minute, and, accordingly, a molded product having good appearance tends to be difficult to obtain.

[3. Polyhydric Alcohol Fatty Acid Ester]

Example of the polyhydric alcohol fatty acid ester used in one or more embodiments of the present invention encompass esters each obtained from (i) a higher fatty acid having 10 to 24 carbon atoms and (ii) a polyhydric alcohol (for example, ethylene glycol, glycerin, 1,2,4-butanetriol, diglycerin, pentaerythritol, sorbitol, erythritol, hexanetriol, or the like). Each of those polyhydric alcohol fatty acid esters can be used solely. Alternatively, two or more of those polyhydric alcohol fatty acid esters can be used in combination. Of those polyhydric alcohol fatty acid esters, a glycerin fatty acid ester (for example, a mono-fatty acid ester of glycerin, a di-fatty acid ester of glycerin, or a tri-fatty acid ester of glycerin) may be used in view of an effect on an in-mold expanding and molding property, availability, cost, and the like.

Examples of the glycerin fatty acid ester encompass lauric acid monoglyceride, lauric acid diglyceride, lauric acid triglyceride, palmitic acid monoglyceride, palmitic acid diglyceride, palmitic acid triglyceride, stearic acid monoglyceride, stearic acid diglyceride, stearic acid triglyceride. Of those glycerin fatty acid esters, stearic acid monoglyceride, stearic acid diglyceride, or stearic acid triglyceride may be used in view of an effect on an in-mold expanding and molding property, availability, and cost.

An amount of the polyhydric alcohol fatty acid ester contained in the expanded polyethylene resin particles in accordance with one or more embodiments of the present invention may be not less than 0.3 parts by weight and not more than 0.8 parts by weight, or not less than 0.4 parts by weight and not more than 0.6 parts by weight, relative to 100 parts by weight of the polyethylene resin. In a case where the amount of the polyhydric alcohol fatty acid ester is less than 0.3 parts by weight, an antistatic property tends to be difficult to achieve. In a case where the amount of the polyhydric alcohol fatty acid ester is more than 0.8 parts by weight, fusibility of the expanded polyethylene resin particles tends to be poor under a condition that a molded product is made thin.

[4. Hydrophilic Compound]

The hydrophilic compound used in one or more embodiments of the present invention indicates (i) a compound containing a hydrophilic group, such as a carboxyl group, a hydroxyl group, an amino group, a sulfo group, or a polyoxyethylene group, in a molecule or (ii) a derivative of such a compound. The hydrophilic compound also encompasses hydrophilic polymers. Concrete examples of a compound containing a carboxyl group encompass lauric acid and lauric acid sodium. Concrete examples of a compound containing a hydroxyl group encompass ethylene glycol and glycerin. The other examples of the hydrophilic compound encompass organic compounds each having a triazine ring. Examples of the organic compounds each having a triazine ring encompass melamine (chemical name: 1,3,5-triazine-2,4,6-triamine), isocyanuric acid, and an isocyanuric acid condensate.

In one or more embodiments of the present invention, a hydrophilic polymer indicates a polymer having a water absorption coefficient of not less than 0.5% by weight, where the water absorption coefficient is measured according to ASTM D570. The hydrophilic polymer encompasses so-called moisture-absorbing polymers, water-absorbing polymers, and water-soluble polymers. Note that a water-absorbing polymer is a polymer which is not dissolved in water, which absorbs water several times to several hundred times a weight of the polymer, and from which water is not easily removed even in a case where the polymer is pressurized. As defined herein, a water-soluble polymer is a polymer which is dissolved in water at an ordinary temperature or at a high temperature.

Concrete examples of the hydrophilic polymer encompass:

ionomer resins each obtained by (i) neutralizing, with an alkali metal ion, such as a sodium ion or a potassium ion, or a transition metal ion, such as a zinc ion, a carboxylic acid group of an ethylene-acrylic acid-maleic anhydride terpolymer or of an ethylene-(meth)acrylic acid copolymer and (ii) cross-linking such neutralized polymers; carboxyl group containing polymers such as an ethylene-(meth)acrylic acid copolymer;

polyamides such as nylon-6, nylon-6,6, and a nylon copolymer; non-ionic water-absorbing polymers such as polyethylene glycol and polypropylene glycol;

polyether-polyolefin resin block copolymers typified by Pelestat (product name, manufactured by Sanyo Chemical Industries, Ltd.,) and the like; and crosslinked polyethylene oxide polymers typified by AQUA CALK (product name, manufactured by Sumitomo Seika Chemicals Company Limited) and the like. Each of those hydrophilic polymers can be used solely. Alternatively, two or more of those hydrophilic polymers can be used in combination. Of those hydrophilic polymers, a non-ionic water-absorbing polymer or a polyether-polyolefin resin block copolymer may be used because each of the non-ionic water-absorbing polymer and the polyether-polyolefin resin block copolymer (i) is relatively good in dispersion stability in a pressure-resistant vessel and (ii) exhibits a water-absorbing property even in a case where an amount of each of the non-ionic water-absorbing polymer and the polyether-polyolefin resin block copolymer is relatively small. Furthermore, glycerin, polyethylene glycol, polypropylene glycol, or melamine may be used because each of glycerin, polyethylene glycol, polypropylene glycol, and melamine causes one or more embodiments of the present invention to bring about a more significant effect.

An amount of the hydrophilic compound contained in the expanded polyethylene resin particles in accordance with one or more embodiments of the present invention may be not less than 0.01 parts by weight and not more than 10 parts by weight, or not less than 0.03 parts by weight and not more than 5 parts by weight, or not less than 0.05 parts by weight and not more than 1 part by weight, relative to 100 parts by weight of the polyethylene resin. In a case where the amount of the hydrophilic compound is less than 0.01 parts by weight, expanded particles having a high expansion ratio tends not to be obtained. In a case where the amount of the hydrophilic compound is more than 10 parts by weight, a further increase in expansion ratio tends to be difficult to achieve, and an expanded molded product to be obtained may be poor in surface appearance and in mechanical property.

The expanded polyethylene resin particles in accordance with one or more embodiments of the present invention can contain, as necessary, an antioxidant, an antistatic agent, a coloring agent, a flame retarder, and/or the like.

[5. Production of Expanded Polyethylene Resin Particles, and Production of Polyethylene Resin Expanded Molded Product]

In order that the expanded polyethylene resin particles used in one or more embodiments of the present invention are produced, polyethylene resin particles to be expanded are first produced. The polyethylene resin particles can be produced by, for example, the following method.

The polyethylene resin serving as a base material resin is mixed with the cell nucleating agent, the polyhydric alcohol fatty acid ester, the hydrophilic compound, and, as necessary, any other additive by a dry blending method, a masterbatch method, or the like. Next, a resultant mixture is melted and kneaded with use of an extruder, a kneader, a Bunbury mixer (registered trademark), a roller, or the like, and is then finely cut into particles with use of a cutter or the like. As a result, the polyethylene resin particles are obtained.

A weight of each of the polyethylene resin particles in accordance with one or more embodiments of the present invention may be not less than 2.5 mg and not more than 3.5 mg, or not less than 2.7 mg and not more than 3.3 mg. In a case where the weight of each of the polyethylene resin particles is less than 2.5 mg, an expanded molded product having a high expansion ratio tends to be high in shrinkage ratio with respect to a mold. In a case where the weight of each of the polyethylene resin particles is more than 3.5 mg, a thinner part of an expanded molded product tends to be poor in surface property or to be poorly stretched. As defined herein, the weight of each of the polyethylene resin particles indicates an average particle weight obtained from randomly selected 100 polyethylene resin particles. The weight of each of the polyethylene resin particles hardly varies even in a case where the polyethylene resin particles are expanded. Therefore, the weight of each of the polyethylene resin particles can be regarded as a weight of each of the expanded polyethylene resin particles.

With use of the polyethylene resin particles thus obtained, it is possible to produce the expanded polyethylene resin particles used in one or more embodiments of the present invention.

Examples of a method of producing the expanded polyethylene resin particles encompass a method in which the following expanding step is carried out: (i) the polyethylene resin particles and a foaming agent are dispersed into an aqueous dispersion medium in a closed vessel, (ii) an inside of the closed vessel is heated to a temperature equal to or higher than a softening temperature of the polyethylene resin particles and is pressurized, and then (iii) the polyethylene resin particles impregnated with the foaming agent are released into a low pressure region, in which a pressure is lower than a pressure inside the closed vessel (usually, the pressure in the low pressure region is equal to atmospheric pressure) (in other words, a method of producing the expanded polyethylene resin particles in an aqueous dispersion system).

Specifically, for example, the polyethylene resin particles, the aqueous dispersion medium, and, as necessary, a dispersing agent and/or the like are put into the closed vessel. The inside of the closed vessel is then vacuumed as necessary. Subsequently, the foaming agent is introduced into the closed vessel so that the pressure inside the closed vessel becomes not less than 1 MPa (gage pressure) and not more than 2 MPa (gage pressure). Thereafter, the inside of the closed vessel is heated to a temperature equal to or higher than the softening temperature of the polyethylene resin. This heating causes the pressure inside the closed vessel to be raised to approximately not less than 1.5 MPa (gage pressure) and not more than 5 MPa (gage pressure). After the heating, while, as necessary, (i) the foaming agent is being further introduced into the closed vessel so that the pressure inside the closed vessel is adjusted to a desired foaming pressure and (ii) the temperature inside the closed vessel is being finely adjusted to a foaming temperature, a state inside the closed vessel is maintained for more than 0 (zero) minutes and not more than 120 minutes. Next, the polyethylene resin particles impregnated with the foaming agent are released into the low pressure region, in which the pressure is lower than the pressure inside the closed vessel (usually, the pressure in the low pressure region is equal to atmospheric pressure), so that the expanded polyethylene resin particles are obtained.

For the purpose of adjustment of the expansion ratio, a temperature of an atmosphere into which the polyethylene resin particles impregnated with the foaming agent are released can be adjusted to approximately a room temperature (specifically, 20° C.) to 110° C. The temperature of the atmosphere into which the polyethylene resin particles impregnated with the foaming agent are released may be adjusted to approximately 100° C. with use of steam or the like so that the expanded polyethylene resin particles has a particularly high expansion ratio.

As a method of introducing the foaming agent, the following method, other than the above method, can be, for example, employed. That is, the polyethylene resin particles, the aqueous dispersion medium, and, as necessary, the dispersing agent and/or the like are put into the closed vessel. The inside of the closed vessel is then vacuumed as necessary. Thereafter, while the inside of the closed vessel is being heated to a temperature equal to or higher than the softening temperature of the polyethylene resin, the foaming agent is introduced into the closed vessel. Alternatively, as another method of introducing the foaming agent, the following method can be employed. That is, the polyethylene resin particles, the aqueous dispersion medium, and, as necessary, the dispersing agent and/or the like are put into the closed vessel. The inside of the closed vessel is heated to approximately the foaming temperature. At this time point, the foaming agent is introduced into the closed vessel.

In one or more embodiments of the present invention, the expansion ratio and an average cell diameter of the expanded polyethylene resin particles can be adjusted, for example, by the following method. That is, a pressure-releasing speed during foaming is adjusted by increasing the pressure inside the closed vessel through injection of carbon dioxide, nitrogen, air, a substance used as the foaming agent, or the like into the closed vessel before the polyethylene resin particles impregnated with the foaming agent are released into the low pressure region. Furthermore, the pressure inside the closed vessel is controlled by introducing carbon dioxide, nitrogen, air, the substance used as the foaming agent, or the like into the closed vessel also while the polyethylene resin particles impregnated with the foaming agent are being released into the low pressure region. In this way, the expansion ratio and the average cell diameter can be adjusted.

Alternatively, the expansion ratio and the average cell diameter can be adjusted by appropriately changing the temperature (which is approximately the foaming temperature) inside the closed vessel before the polyethylene resin particles impregnated with the foaming agent are released into the low pressure region. For example, the expansion ratio tends to be higher by (i) increasing the pressure inside the closed vessel, (ii) increasing the pressure-releasing speed, (iii) raising the temperature inside the closed vessel before the polyethylene resin particles are released into the low pressure region, and/or the like. The average cell diameter tends to be smaller by (i) increasing the pressure inside the closed vessel, (ii) increasing the pressure-releasing speed, and/or the like. The expanded polyethylene resin particles in accordance with one or more embodiments of the present invention may exhibit, in a DSC curve obtained by differential scanning calorimetry (DSC), two melting peaks, that is, a low-temperature side melting peak and a high-temperature side melting peak.

In one or more embodiments of the present invention, the DSC curve, which is obtained by carrying out the differential scanning calorimetry with respect to the expanded polyethylene resin particles, is a DSC curve obtained in a case where a temperature of not less than 1 mg and not more than 10 mg of the expanded polyethylene resin particles is raised from 40° C. to 220° C. at a heating rate of 10° C./min. with use of a differential scanning calorimeter.

In one or more embodiments of the present invention, as illustrated in FIG. 1, a heat quantity (Ql), based on the low-temperature side melting peak, and a heat quantity (Qh), based on the high-temperature side melting peak, are defined as follows. That is, it is assumed that, in the DSC curve, (i) a point A is a point at which an absorbed heat quantity is the smallest between the two melting peaks, that is, the low-temperature side melting peak and the high-temperature side melting peak, (ii) a point B is a point at which a tangent line drawn from the point A toward a high-temperature side touches the DSC curve, and (iii) a point C is a point at which a tangent line drawn from the point A toward a low-temperature side touches the DSC curve. In this case, a region surrounded by a line segment A-B and the DSC curve indicates the heat quantity (Qh) based on the high-temperature side melting peak, and a region surrounded by a line segment A-C and the DSC curve indicates the heat quantity (Ql) based on the low-temperature side melting peak.

According to the expanded polyethylene resin particles in accordance with one or more embodiments of the present invention, a ratio (Qh/(Ql+Qh)×100 (hereinafter, also referred to as a "DSC ratio")) of the heat quantity (Qh) based on the high-temperature side melting peak to a total heat quantity based on the two melting peaks is not limited in particular, but may be not less than 20% and not more than 55%. In a case where the DSC ratio is less than 20%, expanding power of the expanded polyethylene resin particles is too high, and merely expanded polyethylene resin particles which are located in a vicinity of a surface of the mold (which are to constitute a surface layer of an expanded molded product) are expanded at a burst and fused to each other in an initial phase of in-mold expanding and molding. This tends to (i) cause steam used in the in-mold expanding and molding not to permeate expanded polyethylene resin particles which are located in a vicinity of a center of the mold and (ii) result in an expanded molded product in which expanded polyethylene resin particles constituting an inner part of the expanded molded product are poorly fused to each other. In a case where the DSC ratio is more than 55%, the expanding power of the expanded polyethylene resin particles is too low. This tends to (i) result in an expanded molded product in which the expanded polyethylene resin particles are, as a whole, poorly fused to each other or (ii) require a high molding pressure so that the expanded polyethylene resin particles are fused to each other.

According to one or more embodiments of the present invention, during production of the expanded polyethylene resin particles, the DSC ratio can be adjusted by appropriately changing (i) the temperature inside the closed vessel before the polyethylene resin particles impregnated with the foaming agent are released into the low pressure region or (ii) maintaining a time period, during which the state inside the closed vessel is maintained, before the polyethylene resin particles impregnated with the foaming agent are released into the low pressure region. The DSC ratio tends to be higher by reducing the temperature inside the closed vessel, prolonging the maintaining time period, and/or the like.

The closed vessel used in one or more embodiments of the present invention is not limited to any particular one, provided that the closed vessel resists the pressure inside the closed vessel and the temperature inside the closed vessel during the production of the expanded polyethylene resin particles. Examples of the closed vessel encompass an autoclave-type pressure-resistant vessel.

Examples of the foaming agent used in one or more embodiments of the present invention encompass: saturated hydrocarbons such as propane, butane, and pentane; ethers such as dimethyl ether; alcohols such as methanol and ethanol; and inorganic gases such as air, nitrogen, carbon dioxide, and water. Each of those foaming agents can be used solely. Alternatively, two or more of those foaming agents can be used in combination. Of those foaming agents, since carbon dioxide and water each have a small environmental load and have no dangerous inflammability, carbon dioxide or water may be used. In one or more embodiments of the present invention, carbon dioxide may be used.

As the aqueous dispersion medium used in one or more embodiments of the present invention, a dispersion medium composed only of water may be used. Alternatively, a dispersion medium can also be used which is obtained by adding methanol, ethanol, ethylene glycol, glycerin, or the like to water. In one or more embodiments of the present invention, in a case where the polyethylene resin particles contain a hydrophilic compound, water in the aqueous dispersion medium serves also as a foaming agent. This contributes to an increase in the expansion ratio.

According to the method of producing the expanded polyethylene resin particles in accordance with one or more embodiments of the present invention, the dispersing agent may be added to the aqueous dispersion medium so as to prevent the polyethylene resin particles from adhering to each other. Examples of dispersing agent used in one or more embodiments of the present invention encompass inorganic dispersing agents such as tertiary calcium phosphate, tertiary magnesium phosphate, basic magnesium carbonate, calcium carbonate, barium sulphate, kaolin, talc, and clay. Each of those dispersing agents can be used solely. Alternatively, two or more of those dispersing agents can be used in combination.

According to the method of producing the expanded polyethylene resin particles in accordance with one or more embodiments of the present invention, a dispersion auxiliary agent may be used together with the dispersing agent.

Examples of the dispersion auxiliary agent used in one or more embodiments of the present invention encompass:

anionic surfactants of carboxylate type such as N-acylamino acid salt, alkyl ether carboxylate, and acyl peptide; anionic surfactants of sulfonate type such as alkylsulfonate salt, n-paraffin sulfonate salt, alkyl benzene sulfonate, alkyl naphthalene sulfonate, and sulfosuccinate; anionic surfactants of sulfate ester type such as sulfonated oil, alkyl sulfate salt, alkyl ether sulfate, and alkyl amide sulfate; and anionic surfactants of phosphate ester type such as alkyl phosphate, polyoxyethylene phosphate, and alkyl allyl ether sulfate. Examples of the dispersion auxiliary agent further encompass: polymer surfactants of polycarboxylic acid type such as maleic acid copolymer salt and polyacrylate; and poly-anionic polymer surfactants such as polystyrenesulfonate and naphthylsulfonic acid formalin condensate salt. Each of those dispersion auxiliary agents can be used solely. Alternatively, two or more of those dispersion auxiliary agents can be used in combination.

Of these, the following may be used in combination: (i) at least one dispersing agent selected from the group consisting of tertiary calcium phosphate, tertiary magnesium phosphate, barium sulfate, and kaolin; and (ii) a dispersion auxiliary agent which is n-paraffin sulfonic acid soda.

Respective amounts of the dispersing agent and the dispersion auxiliary agent each used in one or more embodiments of the present invention vary depending on (i) respective kinds of the dispersing agent and the dispersion auxiliary agent and/or (ii) a kind and an amount of the polyethylene resin particles to be expanded. Normally, the dispersing agent may be used in an amount of not less than 0.1 parts by weight and not more than 3 parts by weight relative to 100 parts by weight of the aqueous dispersion medium, and the dispersion auxiliary agent may be used in an amount of not less than 0.001 parts by weight and not more than 0.1 parts by weight relative to 100 parts by weight of the aqueous dispersion medium.

Normally, the polyethylene resin particles to be expanded may be used in an amount of not less than 20 parts by weight and not more than 100 parts by weight relative to 100 parts by weight of the aqueous dispersion medium so that the polyethylene resin particles are good in dispensability in the aqueous dispersion medium.

Instead of the above-described method of producing the expanded polyethylene resin particles in the aqueous dispersion system, the expanded polyethylene resin particles can be obtained, for example, by the following method without using the aqueous dispersion medium. That is, the expanded polyethylene resin particles can be obtained by (i) bringing the foaming agent into direct contact with the polyethylene resin particles in the closed vessel so that the polyethylene resin particles are impregnated with the foaming agent and then (ii) for example, bringing steam into contact with the polyethylene resin particles, impregnated with the foaming agent, so that the polyethylene resin particles are expanded.

A step of thus obtaining the expanded polyethylene resin particles from the polyethylene resin particles may be referred to as a "first-step expansion process," and the expanded polyethylene resin particles thus obtained may be referred to as "first-step expanded particles."

By (i) further impregnating the first-step expanded particles with an inorganic gas (such as air, nitrogen, or carbon dioxide) so that internal pressure is applied to the first-step expanded particles and then (ii) bringing steam, having a given pressure, into contact with the first-step expanded particles, it is possible to obtain the expanded polyethylene resin particles which have increased in expansion ratio as compared with the first-step expanded particles. Such a step of further expanding the expanded polyethylene resin particles so that the expanded polyethylene resin particles have a higher expansion ratio may be referred to as a "second-step expansion process," and the expanded polyethylene resin particles obtained through the second-step expansion process may be referred to as "second-step expanded particles."

Specifically, the "second-step expansion process" is a step of obtaining the second-step expanded particles, which have increased in expansion ratio as compared with the first-step expanded particles, by (i) impregnating the first-step expanded particles with an inorganic gas (such as air, nitrogen, or carbon dioxide) so that internal pressure is applied to the first-step expanded particles and then (ii) bringing steam, having a given pressure, into contact with the first-step expanded particles.

In one or more embodiments of the present invention, a pressure of the steam used in the second-step expansion process is adjusted to not less than 0.02 MPa (gage pressure) and not more than 0.15 MPa (gage pressure), or not less than 0.03 MPa (gage pressure) and not more than 0.1 MPa (gage pressure), in consideration of the expansion ratio of the second-step expanded particles.

It is possible to appropriately change the internal pressure of the first-step expanded particles impregnated with the inorganic gas, in consideration of the expansion ratio of the second-step expanded particles and/or the like. The internal pressure of the first-step expanded particles may be not less than 0.12 MPa (absolute pressure) and not more than 0.6 MPa (absolute pressure).

The expansion ratio of the expanded polyethylene resin particles in accordance with one or more embodiments of the present invention is not limited in particular, and can be adjusted as necessary. Note, however, that, in view of a reduction in weight of the polyethylene resin expanded molded product obtained by the in-mold expanding and molding, the expansion ratio of the expanded polyethylene resin particles may be not less than twice and not more than 50 times, or not less than 8 times and not more than 45 times, or not less than 11 times and not more than 40 times. In a case where the expansion ratio is less than twice, an effect of a reduction in weight of the polyethylene resin expanded molded product obtained by the in-mold expanding and molding tends to be subtle. In a case where the expansion ratio is more than 50 times, machine characteristics, such as a compressive stress, of the polyethylene resin expanded molded product obtained by the in-mold expanding and molding tend to be poor.

In one or more embodiments of the present invention, the expansion ratio of the expanded polyethylene resin particles is a value calculated as follows. A weight w (g) of the expanded polyethylene resin particles is measured. The expanded polyethylene resin particles are then submerged in ethanol in a graduated cylinder, and a volume v ($cm^3$) of the expanded polyethylene resin particles is measured in accordance with how much a level of the ethanol in the graduated cylinder is raised (submersion method). Thereafter, an absolute specific gravity $\rho b=w/v$ of the expanded polyethylene resin particles is calculated, and a ratio ($\rho r/\rho b$) of the absolute specific gravity to a density $\rho r$ of the polyethylene resin particles, which have not been expanded, is calculated as the expansion ratio of the expanded polyethylene resin particles.

The average cell diameter of the expanded polyethylene resin particles in accordance with one or more embodiments of the present invention may be not less than 140 µm and not more than 500 µm, or not less than 180 µm and not more than 400 µm. In a case where the average cell diameter of the expanded polyethylene resin particles is less than 140 µm, shrinkage of an obtained polyethylene resin expanded molded product tends to be considerable. In a case where the average cell diameter of the expanded polyethylene resin particles is more than 500 µm, the obtained polyethylene resin expanded molded product tends to have poor appearance.

In one or more embodiments of the present invention, the average cell diameter is a value measured as follows.
On an image of a cross section of an expanded particle captured by a microscope, a straight line is drawn so that the straight line passes through substantially a center of the expanded particle. The number n of cells, through which the straight line passes, and an expanded particle diameter L (µm), which is defined as a distance between two points of intersection of the straight line and a surface of the expanded particle, are then read. Thereafter, the average cell diameter is calculated by the following equation (1).

$$\text{Average cell diameter}(\mu m) = L/n \tag{1}$$

A cell diameter is measured by the following method. A straight line is drawn so that the straight line has a maximum length $d_1$ in a cell. A distance $d_2$ between points at which a perpendicular bisector of the straight line is in contact with a periphery of the cell is then measured. An average of $d_1$ and $d_2$ is regarded as the cell diameter. Note that a cell which is not completely included in a region defined by $d_1$ and $d_2$, e.g., a cell merely half of which is included in the region is eliminated from measurement.

In one or more embodiments of the present invention, it is possible to obtain the polyethylene resin expanded molded product by carrying out the in-mold expanding and molding, in which (i) the mold, having a given shape, is filled with the expanded polyethylene resin particles obtained as described above and (ii) the expanded polyethylene resin particles are heated using steam or the like, so that the expanded polyethylene resin particles are fused to each other.

As a general in-mold expanding and molding method, the following methods are, for example, known:
(A) a method in which (i) the expanded polyethylene resin particles are subjected to a pressure treatment with use of an inorganic gas (such as air, nitrogen, or carbon dioxide) so that the expanded polyethylene resin particles are impregnated with the inorganic gas and have a given internal pressure, (ii) the mold is filled with the expanded polyethylene resin particles, and then (iii) the expanded polyethylene resin particles are heated with use of steam so that the expanded polyethylene resin particles are fused to each other;
(B) a method in which (i) the expanded polyethylene resin particles are compressed by gas pressure, (ii) the mold is filled with the expanded polyethylene resin particles, and then (iii) the expanded polyethylene resin particles are heated with use of steam so that the expanded polyethylene resin particles are fused to each other with the help of a restoring force of the expanded polyethylene resin particles; and
(C) a method in which (i) the mold is filled with the expanded polyethylene resin particles which have not been subjected to any particular pretreatment and (ii) the expanded polyethylene resin particles are heated with use of steam so that the expanded polyethylene resin particles are fused to each other.

As the method of producing the polyethylene resin expanded molded product in accordance with one or more embodiments of the present invention, the method (A) may be employed so that the polyethylene resin expanded molded product has a high expansion ratio. Specific examples of a method of expanding and molding, in the mold, the expanded polyethylene resin particles in accordance with one or more embodiments of the present invention so as to produce the polyethylene resin expanded molded product encompass a method in which (i) the expanded polyethylene resin particles are subjected to a pressure treatment with use of an inorganic gas (such as air, nitrogen, or carbon dioxide) so that the expanded polyethylene resin particles are impregnated with the inorganic gas and have a given internal pressure, (ii) a molding space, which is formed by two molds and which can be closed but not hermetically-sealed, is filled with the expanded polyethylene resin particles, (iii) the expanded polyethylene resin particles are heated with use of steam or the like, serving as a heating medium, at a heating steam pressure of approximately 0.05 MPa (gage pressure) to 0.20 MPa (gage pressure) for approximately 3 seconds to 30 seconds so that the expanded polyethylene resin particles are molded and fused to each other, (iv) the molds are cooled down with use of cool water, and then (v) the molds are opened so as to obtain the polyethylene resin expanded molded product.

According to the above production method in accordance with one or more embodiments of the present invention, the internal pressure of the expanded polyethylene resin particles may be 0.12 MPa to 0.16 MPa when the mold is filled with the expanded polyethylene resin particles. In a case where the internal pressure of the expanded polyethylene resin particles is less than 0.12 MPa when the mold is filled with the expanded polyethylene resin particles, a molded product having a high expansion ratio tends not to be obtained. In a case where the internal pressure of the expanded polyethylene resin particles is more than 0.16 MPa when the mold is filled with the expanded polyethylene resin particles, a molded product tends to be poor in fusibility.

A density of the polyethylene resin expanded molded product can be 0.017 g/cm$^3$ to 0.021 g/cm$^3$. However, in view of a reduction in weight of the polyethylene resin expanded molded product, the density may range from 0.019 g/cm$^3$ to 0.020 g/cm$^3$, or from 0.017 g/cm$^3$ to 0.019 g/cm$^3$.

In one or more embodiments of the present invention, a thickness of the polyethylene resin expanded molded product is 10 mm to 40 mm. Generally, in a case where a polyethylene resin expanded molded product which contains an antistatic agent and which has a high expansion ratio is made thin (thickness of 10 mm to 40 mm), such a molded product becomes poor in fusibility. Therefore, in a case where a molded product is caused to have a thickness of 10 mm to 40 mm, the molded product may be improved in fusibility in view of production.

Note that the thickness of the polyethylene resin expanded molded product indicates a thickness of a thinnest part of the polyethylene resin expanded molded product. For example, in a case where the polyethylene resin expanded molded product has a shape of a quadrangular column, this means that the polyethylene resin expanded molded product has three thicknesses. The above-described thickness of the polyethylene resin expanded molded product indicates one of the three thicknesses which one has the lowest value.

By (i) using the expanded polyethylene resin particles in accordance with one or more embodiments of the present invention and (ii) applying internal pressure to the expanded polyethylene resin particles before or at a time when the mold is filled with the expanded polyethylene resin particles, it is possible to obtain a molded product which has an antistatic property and which, despite having a high expansion ratio, is good in fusibility even in a case where the molded product is made thin.

<1> A method of producing a polyethylene resin expanded molded product having a density of 0.017 g/cm³ to 0.021 g/cm³, the method including the steps of: (a) filling a mold with expanded polyethylene resin particles; and (b) heating the expanded polyethylene resin particles so that the expanded polyethylene resin particles are fused to each other, the expanded polyethylene resin particles containing, as a base material resin, a polyethylene resin composition which contains a cell nucleating agent in an amount of not less than 0.08 parts by weight and not more than 0.25 parts by weight, a polyhydric alcohol fatty acid ester in an amount of not less than 0.3 parts by weight and not more than 0.8 parts by weight, and a hydrophilic compound in an amount of not less than 0.01 parts by weight and not more than 10 parts by weight, relative to 100 parts by weight of a polyethylene resin, each of the expanded polyethylene resin particles having a weight of not less than 2.5 mg and not more than 3.5 mg, in the step (a), an internal pressure of 0.12 MPa to 0.16 MPa being applied to the expanded polyethylene resin particles.

<2> The method as set forth in <1>, wherein the polyhydric alcohol fatty acid ester is a glycerin fatty acid ester.

<3> The method as set forth in <1> or <2>, wherein the cell nucleating agent is talc.

EXAMPLES

Next, the method of producing the expanded polyethylene resin particles and the method of producing the polyethylene resin expanded molded product as described in one or more embodiments of the present invention will be described below in detail with reference to Examples and Comparative Examples. Note, however, that one or more embodiments of the present invention are not limited to those Examples and Comparative Examples.

Substances used in Examples and Comparative Examples are as follows. The substances were used in Examples and Comparative Examples without pretreatment such as purification.

Polyethylene resin: linear low-density polyethylene [having a resin density of 0.926 g/cm³, an MI of 2.1 g/10 min., and a melting point of 123° C., and containing 8.2% by weight of 4-methyl-1-pentene];

Talc [manufactured by Hayashi-Kasei Co., Ltd., Talcan PKS];

Polyhydric alcohol fatty acid ester [manufactured by Riken Vitamin Co., Ltd., Rikemaster KF-25, low-density polyethylene masterbatch containing 25% by weight of a glycerin fatty acid ester];

Glycerin [manufactured by Lion Corporation, refined glycerin D];

PEG [manufactured by Lion Corporation, PEG300];

Powdered basic tertiary calcium phosphate [manufactured by Taihei Chemical Industrial Co., Ltd.];

n-paraffin sulfonic acid soda [manufactured by Kao Corporation, LATEMUL PS]

How evaluation was carried out in each of Examples and Comparative Examples will be described below.

<Weight Per Particle>

From obtained polyethylene resin particles, 100 polyethylene resin particles were randomly selected. Then, a weight of each of the 100 polyethylene resin particles was measured, and an average of weights was calculated. The average was regarded as a weight per particle.

<Measurement of Expansion Ratio>

Obtained expanded polyethylene resin particles were dried at 60° C. for 2 hours, and caused to stand still for 1 hour in a room having a temperature of 23° C. and a humidity of 50%. Subsequently, a weight w (g) of the expanded polyethylene resin particles was measured, and a volume v (cm³) of the expanded polyethylene resin particles was measured by a submersion method. Then, an absolute specific gravity $\rho b = w/v$ of the expanded particles was calculated. Thereafter, an expansion ratio $K = \rho r/\rho b$ was calculated from a ratio of the absolute specific gravity to a density $\rho r$ of the polyethylene resin particles which had not been expanded.

<Density of Expanded Molded Product>

A weight W of an obtained expanded molded product, which was an evaluation target, was measured. Furthermore, a volume V of the expanded molded product was measured in accordance with a change in water level which change was observed in a case where the expanded molded product was submerged in water. Then, a density W/V (g/cm³) of the expanded molded product was calculated.

<Sink in Expanded Molded Product>

Dimensions of the obtained expanded molded product, which was an evaluation target, were measured along a lengthwise direction (400-millimeter direction) of the obtained expanded molded product with use of a digital caliper [manufactured by Mitutoyo Corporation]. Then, a sink amount was calculated by the following equation, and evaluated in accordance with criteria below.

$$\text{Molded product sink amount} = L_0 - L_1$$

where: $L_0$ represents a thickness at an edge of the expanded molded product; and $L_1$ represents a thickness at a central portion of the expanded molded product.

Excellent: A sink amount was less than 1 mm.
Good: A sink amount was not less than 1 mm and less than 2 mm.
Poor: A sink amount was not less than 2 mm and less than 3 mm.
Failed: A sink amount was not less than 3 mm.

<Surface Property of Expanded Molded Product>

The obtained expanded molded product, which was an evaluation target, was observed, and a surface property of the expanded molded product was evaluated in accordance with the following criteria.

Excellent: Adjacent expanded particles were completely fused to each other at any portion of an expanded molded product, and there was no gap between the adjacent expanded particles.
Good: There was hardly a gap between adjacent expanded particles.
Poor: A few gaps were observed between adjacent expanded particles.
Failed: Many gaps were observed between adjacent expanded particles.

<Fusibility>

A cut having a depth of approximately 5 mm was made in a vicinity of the central portion of the obtained expanded molded product with use of a knife or the like. The expanded molded product was then cleaved along the cut. A cleaved surface was observed, and a proportion of the number of broken particles observed on the cleaved surface to the number of all particles observed on the cleaved surface was calculated. The proportion was regarded as a fusion rate in a molded product, and evaluated in accordance with the following criteria.
Excellent: A fusion rate was not less than 90%.
Good: A fusion rate was not less than 80% and less than 90%.
Poor: A fusion rate was not less than 60% and less than 80%.
Failed: A fusion rate was less than 60%.

<Antistatic Property>

The obtained expanded molded product was dried for 24 hours under an atmosphere having a temperature of 75° C. to 80° C., and then allowed to stand still for 72 hours in a constant-temperature and constant-humidity room having a temperature of 23° C. and a humidity of 50%. Subsequently, after an electric current was allowed to flow at 500 V for 1 minute, the surface resistivity was measured in accordance with JIS K6911 using a high surface resistivity meter [Hiresta HT-201, manufactured by Mitsubishi Petrochemical Co. Ltd.]. The surface resistivity was measured at 5 portions per sample, and an average of the surface resistivity measured at the 5 portions was calculated and regarded as surface resistivity of the expanded molded product.

Example 1

[Production of Resin Particles]

First, 100 parts by weight of a linear low-density polyethylene serving as a base material resin, 0.2 parts by weight of glycerin serving as a hydrophilic compound, 0.5 parts by weight of a glycerin fatty acid ester serving as an antistatic agent, and 0.12 parts by weight of talc serving as a cell adjusting agent were subjected to dry blending (note that a masterbatch containing 25% by weight of a glycerin fatty acid ester was added to the linear low-density polyethylene so that the amount of the glycerin fatty acid ester was 0.5 parts by weight relative to 100 parts by weight of the linear low-density polyethylene). A mixture obtained by the dry blending was (i) put in a twin-screw extruder having a screw diameter of 45 mm, (ii) melted and kneaded so that a resin temperature became 220° C., and then (iii) extruded in a strand shape through a circular die attached to an end of the extruder. Thereafter, the mixture was cooled down using water, and then cut using a cutter so that polyethylene resin particles each having a weight of 3.0 mg were obtained.

[Production of Expanded Particles]

In a pressure-resistant vessel having a capacity of 200 L (specifically, an autoclave), 100 parts by weight (20 kg) of obtained polyethylene resin particles, 200 parts by weight of water, 0.5 parts by weight of tertiary calcium phosphate serving as a poorly water-soluble inorganic compound, and 0.03 parts by weight of sodium alkylsulfonate serving as a surfactant were loaded. While the polyethylene resin particles, the water, the tertiary calcium phosphate, and the sodium alkylsulfonate were being stirred, 7 parts by weight of a carbon dioxide gas serving as a foaming agent was added.

Contents in the autoclave were heated so that a temperature of the contents was raised to a foaming temperature of 122.8° C. A carbon dioxide gas was then additionally injected into the autoclave so that a pressure inside the autoclave was increased to a foaming pressure of 3.3 MPa (gage pressure).

After the inside of the autoclave was maintained for 30 minutes at the above foaming temperature and at the above foaming pressure, a valve at a lower part of the autoclave was opened so that the contents in the autoclave were released, through an orifice having a diameter of 4.0 mm (a single orifice), into an atmosphere having a temperature of 100° C. Expanded polyethylene resin particles were thus obtained.

After the water content of the obtained expanded polyethylene resin particles was removed, the expanded polyethylene resin particles were loaded in a pressure-resistant vessel and then pressurized so that the expanded polyethylene resin particles were impregnated with air and had an internal pressure of 0.38 MPa. The expanded polyethylene resin particles were then subjected to a second-step expansion process using steam having a heating pressure of 0.066 MPa. Results of evaluating the expanded polyethylene resin particles thus obtained are shown in Table 1.

[Production of Expanded Molded Product]

After the water content of the expanded polyethylene resin particles was removed, an internal pressure of 0.15 MPa was applied to the expanded polyethylene resin particles. A mold having a size of length 400 mm×width 300 mm×thickness 40 mm or a size of length 400 mm×width 300 mm×thickness 20 mm was filled with the expanded polyethylene resin particles, and the expanded polyethylene resin particles were heated using steam having a pressure of 0.1 MPa to 0.13 MPa so that the expanded polyethylene resin particles were expanded and molded. A molded product thus obtained was left for approximately 1 hour under atmospheric pressure. The molded product was then dried for 24 hours under atmospheric pressure using an oven in which a temperature was set to 75° C. A matured molded product was thus obtained. Results of evaluating a non-crosslinked polyethylene resin expanded molded product are shown in Table 1.

Example 2

Polyethylene resin particles, expanded polyethylene resin particles, and a polyethylene resin expanded molded product were obtained as in Example 1, except that a weight per particle was changed to 2.5 mg in [Production of resin particles]. Results of evaluating the expanded polyethylene resin particles and the polyethylene resin expanded molded product thus obtained are shown in Table 1.

Example 3

Polyethylene resin particles, expanded polyethylene resin particles, and a polyethylene resin expanded molded product were obtained as in Example 1, except that a weight per particle was changed to 3.5 mg in [Production of resin particles]. Results of evaluating the expanded polyethylene resin particles and the polyethylene resin expanded molded product thus obtained are shown in Table 1.

Example 4

Polyethylene resin particles, expanded polyethylene resin particles, and a polyethylene resin expanded molded product were obtained as in Example 1, except that internal pressure applied to the expanded polyethylene resin particles was changed to 0.12 MPa in [Production of expanded molded product]. Results of evaluating the expanded polyethylene resin particles and the polyethylene resin expanded molded product thus obtained are shown in Table 1.

Example 5

Polyethylene resin particles, expanded polyethylene resin particles, and a polyethylene resin expanded molded product were obtained as in Example 1, except that internal pressure applied to the expanded polyethylene resin particles was changed to 0.16 MPa in [Production of expanded molded product]. Results of evaluating the expanded polyethylene resin particles and the polyethylene resin expanded molded product thus obtained are shown in Table 1.

Example 6

Polyethylene resin particles, expanded polyethylene resin particles, and a polyethylene resin expanded molded product were obtained as in Example 1, except that an amount of a glycerin fatty acid ester was changed to 0.3 parts by weight in [Production of resin particles]. Results of evaluating the expanded polyethylene resin particles and the polyethylene resin expanded molded product thus obtained are shown in Table 1.

Example 7

Polyethylene resin particles, expanded polyethylene resin particles, and a polyethylene resin expanded molded product were obtained as in Example 1, except that an amount of a glycerin fatty acid ester was changed to 0.8 parts by weight in [Production of resin particles]. Results of evaluating the expanded polyethylene resin particles and the polyethylene resin expanded molded product thus obtained are shown in Table 1.

Example 8

Polyethylene resin particles, expanded polyethylene resin particles, and a polyethylene resin expanded molded product were obtained as in Example 1, except that a kind of a hydrophilic compound was changed to PEG and an amount of the hydrophilic compound was changed to 0.5 parts by weight in [Production of resin particles]. Results of evaluating the expanded polyethylene resin particles and the polyethylene resin expanded molded product thus obtained are shown in Table 1.

Example 9

Polyethylene resin particles, expanded polyethylene resin particles, and a polyethylene resin expanded molded product were obtained as in Example 1, except that an amount of talc was changed to 0.20 parts by weight in [Production of resin particles]. Results of evaluating the expanded polyethylene resin particles and the polyethylene resin expanded molded product thus obtained are shown in Table 1.

Example 10

Polyethylene resin particles, expanded polyethylene resin particles, and a polyethylene resin expanded molded product were obtained as in Example 1, except that a kind of a hydrophilic compound was changed to melamine and an amount of the hydrophilic compound was changed to 3.0 parts by weight in [Production of resin particles]. Results of evaluating the expanded polyethylene resin particles and the polyethylene resin expanded molded product thus obtained are shown in Table 1.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Resin particles | Polyethylene | Parts by weight | 100 | 100 | 100 | 100 | 100 | 100 | 100 | 100 | 100 | 100 |
| | Hydrophilic compound | Kind | glycerin | glycerin | glycerin | glycerin | glycerin | glycerin | glycerin | PEG | glycerin | melamine |
| | | Parts by weight | 0.2 | 0.2 | 0.2 | 0.2 | 0.2 | 0.2 | 0.2 | 0.5 | 0.2 | 3.0 |
| | Stearic acid monoglyceride | Parts by weight | 0.5 | 0.5 | 0.5 | 0.5 | 0.5 | 0.3 | 0.8 | 0.5 | 0.5 | 0.5 |
| | Talc | Parts by weight | 0.12 | 0.12 | 0.12 | 0.12 | 0.12 | 0.12 | 0.12 | 0.12 | 0.20 | 0.12 |
| | Weight per particle | mg | 3.0 | 2.5 | 3.5 | 3.0 | 3.0 | 3.0 | 3.0 | 3.0 | 3.0 | 3.0 |
| First-step expanded particles | Expansion ratio | Times | 11.3 | 10.6 | 11.7 | 11.3 | 11.3 | 11.0 | 11.4 | 10.6 | 11.6 | 11.3 |
| | DSC ratio | % | 30.1 | 30.3 | 29.6 | 30.1 | 30.1 | 30.4 | 30 | 29.6 | 30.1 | 30.1 |
| | Average cell diameter | μm | 150 | 150 | 150 | 150 | 150 | 145 | 150 | 150 | 130 | 120 |
| Second-step expansion conditions | Internal pressure | MPa | 0.38 | 0.4 | 0.37 | 0.38 | 0.38 | 0.38 | 0.35 | 0.39 | 0.38 | 0.38 |
| | Steam pressure | MPa-G | 0.066 | 0.067 | 0.066 | 0.066 | 0.066 | 0.066 | 0.065 | 0.065 | 0.064 | 0.066 |
| Second-step expanded particles | Expansion ratio | Times | 39 | 39 | 39 | 39 | 39 | 39 | 39 | 39 | 39 | 39 |
| | Average cell diameter | μm | 250 | 250 | 260 | 250 | 250 | 250 | 260 | 230 | 200 | 180 |
| Expanded molded product (thickness of 40 mm) | Applied internal pressure | MPa | 0.15 | 0.15 | 0.15 | 0.12 | 0.16 | 0.15 | 0.15 | 0.15 | 0.15 | 0.15 |
| | Molded product density | g/cm³ | 0.019 | 0.020 | 0.020 | 0.019 | 0.018 | 0.019 | 0.019 | 0.020 | 0.020 | 0.020 |

TABLE 1-continued

|  |  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
|  | Surface specific resistance | Ω | $3.3 \times 10^{12}$ | $3.3 \times 10^{12}$ | $6.7 \times 10^{12}$ | $3.3 \times 10^{12}$ | $3.3 \times 10^{12}$ | $6.2 \times 10^{12}$ | $1.1 \times 10^{12}$ | $6.7 \times 10^{12}$ | $3.3 \times 10^{12}$ | $3.3 \times 10^{12}$ |
|  | Sink | — | E | G | E | G | E | G | G | E | E | G |
|  | Fusibility | — | E | E | E | E | G | E | G | E | E | E |
|  | Surface property | — | E | E | G | G | E | E | E | E | E | G |
| Expanded molded product (thickness of 20 mm) | Applied internal pressure | MPa | 0.15 | 0.15 | 0.15 | 0.12 | 0.16 | 0.15 | 0.15 | 0.15 | 0.15 | 0.15 |
|  | Molded product density | g/cm³ | 0.019 | 0.020 | 0.020 | 0.019 | 0.018 | 0.019 | 0.019 | 0.020 | 0.020 | 0.020 |
|  | Surface specific resistance | Ω | $3.3 \times 10^{12}$ | $3.3 \times 10^{12}$ | $6.7 \times 10^{12}$ | $3.3 \times 10^{12}$ | $3.3 \times 10^{12}$ | $6.2 \times 10^{12}$ | $1.1 \times 10^{12}$ | $6.7 \times 10^{12}$ | $6.7 \times 10^{12}$ | $6.7 \times 10^{12}$ |
|  | Sink | — | E | G | E | G | E | E | G | E | E | G |
|  | Fusibility | — | E | E | E | E | G | E | G | E | E | E |
|  | Surface property | — | E | E | G | E | E | E | E | E | E | G |

Abbreviations
"Ex." stands for "Example",
"E" stands for "excellent," and
"G" stands for "good."

Comparative Example 1

Polyethylene resin particles, expanded polyethylene resin particles, and a polyethylene resin expanded molded product were obtained as in Example 1, except that a weight per particle was changed to 4.5 mg in [Production of resin particles]. Results of evaluating the expanded polyethylene resin particles and the polyethylene resin expanded molded product thus obtained are shown in Table 2.

Comparative Example 2

Polyethylene resin particles, expanded polyethylene resin particles, and a polyethylene resin expanded molded product were obtained as in Example 1, except that a weight per particle was changed to 2.0 mg in [Production of resin particles]. Results of evaluating the expanded polyethylene resin particles and the polyethylene resin expanded molded product thus obtained are shown in Table 2.

Comparative Example 3

Polyethylene resin particles, expanded polyethylene resin particles, and a polyethylene resin expanded molded product were obtained as in Example 1, except that an amount of a glycerin fatty acid ester was changed to 1.0 parts by weight in [Production of resin particles]. Results of evaluating the expanded polyethylene resin particles and the polyethylene resin expanded molded product thus obtained are shown in Table 2.

Comparative Example 4

Polyethylene resin particles, expanded polyethylene resin particles, and a polyethylene resin expanded molded product were obtained as in Example 1, except that an amount of a glycerin fatty acid ester was changed to 0.25 parts by weight in [Production of resin particles]. Results of evaluating the expanded polyethylene resin particles and the polyethylene resin expanded molded product thus obtained are shown in Table 2.

Comparative Example 5

Polyethylene resin particles, expanded polyethylene resin particles, and a polyethylene resin expanded molded product were obtained as in Example 1, except that internal pressure applied to the expanded polyethylene resin particles was changed to 0 (zero) MPa (no internal pressure was applied) in [Production of expanded molded product]. Results of evaluating the expanded polyethylene resin particles and the polyethylene resin expanded molded product thus obtained are shown in Table 2.

Comparative Example 6

Polyethylene resin particles, expanded polyethylene resin particles, and a polyethylene resin expanded molded product were obtained as in Example 1, except that internal pressure applied to the expanded polyethylene resin particles was changed to 0.2 MPa in [Production of expanded molded product]. Results of evaluating the expanded polyethylene resin particles and the polyethylene resin expanded molded product thus obtained are shown in Table 2.

Comparative Example 7

Polyethylene resin particles, expanded polyethylene resin particles, and a polyethylene resin expanded molded product were obtained as in Example 1, except that an amount of talc was changed to 0.03 parts by weight in [Production of resin particles]. Results of evaluating the expanded polyethylene resin particles and the polyethylene resin expanded molded product thus obtained are shown in Table 2.

Comparative Example 8

Polyethylene resin particles, expanded polyethylene resin particles, and a polyethylene resin expanded molded product were obtained as in Example 1, except that an amount of talc was changed to 0.3 parts by weight in [Production of resin particles]. Results of evaluating the expanded polyethylene resin particles and the polyethylene resin expanded molded product thus obtained are shown in Table 2.

Comparative Example 9

Polyethylene resin particles, expanded polyethylene resin particles, and a polyethylene resin expanded molded product were obtained as in Example 1, except that a kind of a hydrophilic compound was changed to melamine and an amount of the hydrophilic compound was changed to 15 parts by weight in [Production of resin particles]. Results of evaluating the expanded polyethylene resin particles and the polyethylene resin expanded molded product thus obtained are shown in Table 2.

TABLE 2

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| Resin particles | Polyethylene | Parts by weight | 100 | 100 | 100 | 100 | 100 | 100 | 100 | 100 | 100 |
| | Hydrophilic compound | Kind | glycerin | glycerin | glycerin | glycerin | glycerin | glycerin | glycerin | glycerin | melamine |
| | | Parts by weight | 0.2 | 0.2 | 0.2 | 0.2 | 0.2 | 0.2 | 0.2 | 0.2 | 15 |
| | Stearic acid monoglyceride | Parts by weight | 0.5 | 0.5 | 1.0 | 0.25 | 0.5 | 0.5 | 0.5 | 0.5 | 0.5 |
| | Talc | Parts by weight | 0.12 | 0.12 | 0.12 | 0.12 | 0.12 | 0.12 | 0.03 | 0.3 | 0.12 |
| | Weight per particle | mg | 4.5 | 2.0 | 3.0 | 3.0 | 3.0 | 3.0 | 3.0 | 3.0 | 3.0 |
| First-step expanded particles | Expansion ratio | Times | 11.3 | 10.1 | 11.1 | 10.9 | 11.3 | 11.3 | 7.0 | 11.4 | 11.4 |
| | DSC ratio | % | 30.1 | 30.6 | 30 | 30.4 | 30.1 | 30.1 | 30.1 | 30 | 30 |
| | Average cell diameter | μm | 150 | 140 | 150 | 150 | 150 | 150 | 150 | 80 | 80 |
| Second-step expansion conditions | Internal pressure | MPa | 0.38 | 0.4 | 0.4 | 0.4 | 0.38 | 0.38 | 0.45 | 0.38 | 0.38 |
| | Steam pressure | MPa-G | 0.066 | 0.066 | 0.065 | 0.066 | 0.066 | 0.066 | 0.07 | 0.07 | 0.07 |
| Second-step expanded particles | Expansion ratio | Times | 39 | 39 | 40 | 39 | 39 | 39 | 32 | 39 | 39 |
| | Average cell diameter | μm | 250 | 250 | 250 | 250 | 250 | 250 | 200 | 140 | 140 |
| Expanded molded product 1 (thickness of 40 mm) | Applied internal pressure | MPa | 0.15 | 0.15 | 0.15 | 0.12 | 0 | 0.20 | 0.15 | 0.15 | 0.15 |
| | Molded product density | g/cm$^3$ | 0.019 | 0.019 | 0.018 | 0.020 | 0.021 | 0.018 | 0.022 | 0.019 | 0.019 |
| | Surface specific resistance | Ω | $1.2 \times 10^{13}$ | $6.7 \times 10^{12}$ | $2.0 \times 10^{11}$ | $1.2 \times 10^{14}$ | $1.2 \times 10^{13}$ | $1.2 \times 10^{13}$ | $1.2 \times 10^{13}$ | $1.2 \times 10^{13}$ | $1.0 \times 10^{13}$ |
| | Sink | — | G | P | G | G | F | G | G | G | G |
| | Fusibility | — | G | G | F | E | E | F | G | G | G |
| | Surface property | — | P | G | G | E | G | G | G | F | F |
| Expanded molded product 1 (thickness of 20 mm) | Applied internal pressure | MPa | 0.15 | 0.15 | 0.15 | 0.12 | 0 | 0.20 | 0.15 | 0.15 | 0.15 |
| | Molded product density | g/cm$^3$ | 0.019 | 0.019 | 0.018 | 0.020 | 0.021 | 0.018 | 0.022 | 0.019 | 0.019 |
| | Surface specific resistance | Ω | $1.2 \times 10^{13}$ | $6.7 \times 10^{12}$ | $2.0 \times 10^{11}$ | $1.2 \times 10^{14}$ | $1.2 \times 10^{13}$ | $1.2 \times 10^{13}$ | $1.2 \times 10^{13}$ | $1.2 \times 10^{13}$ | $1.0 \times 10^{13}$ |
| | Sink | — | G | P | G | G | F | G | G | G | G |
| | Fusibility | — | G | G | F | E | E | F | G | G | G |
| | Surface property | — | P | G | G | E | G | G | G | F | F |

Abbreviations:
"Comp. Ex," stands for "Comparative Example,"
"E" stands for "excellent,"
"G" stands for "good,"
"P" stands for "poor," and
"F" stands for "failed."

One or more embodiments of the present invention can be used in a field of production of shock-absorbing packing materials or heat insulating materials.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A method of producing a polyethylene resin expanded molded product, the method comprising:
    filling a mold with expanded polyethylene resin particles, wherein an internal pressure of 0.12 to 0.16 MPa is applied to the expanded polyethylene resin particles in the mold; and
    forming the polyethylene resin expanded molded product by heating the expanded polyethylene resin particles and fusing the expanded polyethylene resin particles,
    wherein the expanded polyethylene resin particles comprise:
    100 parts by weight of a polyethylene resin;
    0.08 to 0.25 parts by weight of a cell nucleating agent;
    0.3 to 0.8 parts by weight of a polyhydric alcohol fatty acid ester; and
    0.01 to 10 parts by weight of a hydrophilic compound, each of the expanded polyethylene resin particles having a weight of 2.5 to 3.5 mg, and
    wherein the polyethylene resin expanded molded product has a density of 0.017 to 0.021 $g/cm^3$ and a thickness of 10 to 40 mm.

2. The method according to claim 1, wherein the polyhydric alcohol fatty acid ester is a glycerin fatty acid ester.

3. The method according to claim 1, wherein the cell nucleating agent is an inorganic nucleating agent.

4. The method according to claim 2, wherein the cell nucleating agent is an inorganic nucleating agent.

5. The method according to claim 3, wherein the cell nucleating agent is selected from the group of consisting of talc, calcium stearate, calcium carbonate, silica, kaolin, titanium oxide, bentonite, and barium sulphate.

6. The method according to claim 4, wherein the cell nucleating agent is selected from the group of consisting of talc, calcium stearate, calcium carbonate, silica, kaolin, titanium oxide, bentonite, and barium sulphate.

7. The method according to claim 1, wherein the hydrophilic compound is a compound comprising a carboxyl group or a derivative thereof, a compound comprising a hydroxyl group or a derivative thereof, a compound comprising an amino group or a derivative thereof, a compound comprising a sulfo group or a derivative thereof, a compound comprising a polyoxyethylene group or a derivative thereof, or a hydrophilic polymer.

8. The method according to claim 2, wherein the hydrophilic compound is a compound comprising a carboxyl group or a derivative thereof, a compound comprising a hydroxyl group or a derivative thereof, a compound comprising an amino group or a derivative thereof, a compound comprising a sulfo group or a derivative thereof, a compound comprising a polyoxyethylene group or a derivative thereof, or a hydrophilic polymer.

9. The method according to claim 3, wherein the hydrophilic compound is a compound comprising a carboxyl group or a derivative thereof, a compound comprising a hydroxyl group or a derivative thereof, a compound comprising an amino group or a derivative thereof, a compound comprising a sulfa group or a derivative thereof, a compound comprising a polyoxyethylene group or a derivative thereof, or a hydrophilic polymer.

10. The method according to claim 4, wherein the hydrophilic compound is a compound comprising a carboxyl group or a derivative thereof, a compound comprising a hydroxyl group or a derivative thereof, a compound comprising an amino group or a derivative thereof, a compound comprising a sulfo group or a derivative thereof, a compound comprising a polyoxyethylene group or a derivative thereof, or a hydrophilic polymer.

11. The method according to claim 5, wherein the hydrophilic compound is a compound comprising a carboxyl group or a derivative thereof, a compound comprising a hydroxyl group or a derivative thereof, a compound comprising an amino group or a derivative thereof, a compound comprising a sulfo group or a derivative thereof, a compound comprising a polyoxyethylene group or a derivative thereof, or a hydrophilic polymer.

12. The method according to claim 6, wherein the hydrophilic compound is a compound comprising a carboxyl group or a derivative thereof, a compound comprising a hydroxyl group or a derivative thereof, a compound comprising an amino group or a derivative thereof, a compound comprising a sulfo group or a derivative thereof a compound comprising a polyoxyethylene group or a derivative thereof, or a hydrophilic polymer.

\* \* \* \* \*